Patented June 6, 1939

2,161,515

UNITED STATES PATENT OFFICE 2,161,515

MANUFACTURE OF ALKALI METASILICATES AND ALKALI METASILICATE-CONTAINING COMPOSITIONS

Max Jaeger and Franz Besemann, Bitterfeld, Germany, assignors to I. G. Farbenindustrie Aktiengesellschaft, Frankfort - on - the - Main, Germany No Drawing. Application January 13, 1933, Serial No. 651,620. In Germany January 20, 1932

5 Claims. (Cl. 23—110)

The present invention relates to improvements in the production of alkali metal metasilicates and compositions containing alkali metal metasilicate which may be employed with advantage for various purposes.

In the preparation of alkali metal metasilicates, when starting either from aqueous solutions containing the metasilicate as such or in the form of its components, namely caustic alkali and silicic acid, the difficulty arises that concentration by evaporation under atmospheric and reduced pressure in order to cause crystallisation of the metasilicate invariably leads to the formation of a glassy solid product instead of crystallisation. It is therefore an object of the present invention, to furnish a simple process by which alkali metal metasilicates are obtained in a crystallised, and if desired also a pulverulent condition, by means which at the same time are simple and economical. Another object of the present invention is the utilisation of the products obtained in the aforesaid manner for various purposes. Further objects of the present invention will become apparent below.

We have observed that when crystalline silicic acid is heated with caustic alkali lyes of commercial concentration to boiling temperatures the interaction of the caustic alkali lye with the silicic acid finally leads to the formation of a solid product which is finely pulverulent and substantially consists of the crystallised alkali metal metasilicate, the remainder being a moderate percentage of caustic alkali.

When preparing for instance sodium metasilicate according to the present invention, the caustic soda lye is preferably employed in a quantity somewhat in excess over that required by the reacting proportions while the silicic acid is preferably employed in the form of finely ground quartz sand. The reaction mixture is subjected to boiling temperatures while maintaining a continuous agitation of the mass, for instance by stirring. When the surplus water is evaporated the reaction sets in at about 140° C., becomes vivid at about 180° C. and is completed at between about 220 and 230° C. In the course of this reaction the originally mobile lye by combining with the silicic acid gradually assumes a viscous condition which gradually changes into a pasty one. Towards the termination of the treatment this pasty mass disintegrates into globular lumps which, on further heating, yield a finely pulverulent product. In order to remove the water still contained in the latter the temperature may be further increased to about 250 to 300° C. The product, which is practically anhydrous, is owing to the low temperatures employed in the process, easily soluble in water. The solution is perfectly clear and may only contain a very small percentage of undecomposed sand which easily settles to the bottom of the vesssel. The composition of the product is approximately 60 to 70 percent of NaOH titre, 35 to 40 percent of $SiO_2$, which shows that it substantially consists of $Na_2SiO_3$ admixed with about 10 to 15 percent of NaOH.

Example 1

55 kgs. of quartz sand of a quality such as is employed in the glass-ware industry and in the condition as it comes from the sand pit and containing about 8% to 10% of water are heated with 75 kgs. of NaOH (in the form of commercial 50 percent caustic soda lye) in a rotatable drum-shaped vessel heated by a hydrogen gas jet from within while continuously revolving the vessel. Evaporation proceeds in the above-described manner while the temperature is slowly raised up to about 250 or 300° C. In the course of the procedure the reaction mixture becomes first viscous, then pasty, further disintegrates into globular lumps and finally into a fine powder. 110 kgs. of a product consisting of 80 to 90 percent of $Na_2SiO_3$ and 10 to 15 percent of NaOH are obtained.

The preparation of the corresponding product substantially consisting of potassium metasilicate is effected in a similar manner while, however, observing certain conditions of working which are necessitated by the enhanced tendency of the potassium metasilicate mono-hydrate to form glassy masses on solidification. We have observed that this phenomenon may be prevented from taking place by allowing the crystallisation of the mono-hydrate to be completed at between about 190° to 200° C. while taking care that the temperature during crystallisation does not substantially rise beyond the upper limit of this range, and while maintaining a certain definite water vapour pressure in the atmosphere overlying the solution, such water vapour pressure preferably ranging between about 200 and 500 mms. of mercury column (partial pressure). When the temperature of the reaction mass during crystallisation is allowed to rise substantially beyond the said limit of 200° C., the crystals already formed are apt to melt again—further water at the same time being driven off at the comparatively high temperatures prevailing— and on again solidifying will yield glassy masses, which should be avoided.

In the technical application of the process according to the present invention to the making of the potassium metasilicate product, we preferably proceed as follows:—

A mixture of finely ground quartz and caustic potassium lye, containing the caustic lye somewhat in excess over the quantity corresponding to reacting proportions is heated while stirring to boiling temperatures, the boiling point slowly rising as evaporation proceeds. On attaining a temperature of just above 190° C., boiling progresses but sluggishly, while crystallisation sets in. The temperature is then maintained at between about 190 to 200° C. and the partial water vapour tension at, say, one half of an atmosphere, until the product has completely crystallised. When in this condition, the pulverulent reaction product may be completely dehydrated, if desired, by the application of moderately higher temperatures without risking a remelting of the mass. Instead of maintaining normal (atmospheric) pressure during the reaction, also reduced pressure may be applied in order to facilitate evaporation.

The final product substantially consists of $K_2SiO_3$ with about 5 percent of free KOH.

*Example 2*

A mixture of 100 ltrs. of 50 percent caustic potassium lye and 39 kgs. of quartz ground to dust is maintained in a boiling condition by heating in a revolving drum-shaped vessel provided with a stirrer. At about 180° C., the quartz has completely dissolved in the lye. When a temperature of about 190° C. is attained and boiling proceeds but sluggishly, the heat supply is checked and care is taken to maintain a partial water vapour tension of about one-half of an atmosphere in the vessel, and not to allow the temperature to rise beyond about 200° C. until complete solidification of the product has taken place. When the mass has solidified, the temperature is further raised to about 250° C. so as to completely dehydrate the product. 102 kgs. of the latter are obtained in a finely pulverulent condition having the composition of between about 93 and 94 percent of $K_2SiO_3$ and about 5 percent of free KOH.

On dissolution in cold or warm water, the sodium metasilicate composition obtained according to the invention yields an excellent detergent. From other known detergents substantially consisting of sodium metasilicate, the product is distinguished by its content of free caustic soda lye which considerably enhances its cleansing efficiency, particularly when it is a question of removing residues which are subject to germination (milk, beer, fat, remnants of meals etc.). On the other hand the percentage of free caustic soda contained in the composition is not so high that it would be sufficient to give rise to a corrosion of the metals used in the manufacture of vessels and, in contradistinction to the employment of caustic soda as such, as a detergent, the formation of a precipitate of lime or magnesia on the walls of the vessels which cannot be removed by rinsing, is obviated. The high metasilicate content of the product further has a strong emulsifying effect.

By dissolving the sodium metasilicate product in a limited quantity of water with the application of heat, and then cooling the solution, sodium metasilicate of a high purity may be obtained by crystallisation. By evaporating or spray-drying a filtered solution of the composition at suitable temperatures it is also possible to produce a product similar in composition to the original one which is soluble in water without leaving any residue whatever.

The potassium metasilicate product may be employed with advantage in the production of soft soaps in order to enhance the cleansing efficiency of the soap.

It is frequently desirable to incorporate hypochlorite compounds in detergents in order to impart to them also disinfecting properties.

In the case of the sodium metasilicate product obtained according to the invention this may be effected in a particularly simple manner by admixing a certain quantity of a solid hypochlorite compound, preferably calcium hypochlorite, to the powder obtained as a final product in the process hereinbefore described, the resulting mixture being, contrary to all expectation, entirely stable. It is further possible to introduce chlorine as such into the sodium metasilicate product by treating the aqueous solution of the powder with chlorine gas. In this manner it is not only possible to convert the free caustic soda content of the composition into sodium hypochlorite, but also to chlorinate part of the caustic soda existing in the form of silicate without causing a precipitation of silicic acid.

*Example 3*

A product obtained according to Example 1 having 62.7 percent NaOH titre and 37 percent of $SiO_2$ is dissolved in three times its weight of water, and after filtration is treated with a current of gaseous chlorine. When the solution contains 67 grs. of available chlorine per litre, chlorination is discontinued. The solution then contains 116 grs. NaOH titre, 126 grs. $SiO_2$, and 67 grs. of available chlorine per litre and its specific gravity amounts to 1.27 at 20° C.

When this solution is diluted with water in the proportion 1:100 it constitutes an excellent cleansing medium having disinfecting properties, which does not cause corrosion even with metals such as tin-plate or aluminium which are otherwise frequently liable to corrosive attack.

We claim:

1. A process which comprises heating quartz sand with a quantity of caustic potassium lye of commercial concentration in an excess of several percent of that theoretically required for the formation of the metasilicate to boiling temperatures while agitating the reaction mass, until a temperature of about 190° C. is attained, and then maintaining a temperature between about 190° C. and about 200° C., until crystallisation of the mass is completed.

2. A process which comprises heating quartz sand with a quantity of caustic potassium lye of commercial concentration in an excess of several percent of that theoretically required for the formation of the metasilicate to boiling temperatures while agitating the reaction mass, until a temperature of about 190° C. is attained, then maintaining a temperature between about 190° C. and about 200° C., until crystallisation of the mass is completed, and finally dehydrating the product by the application of still higher temperatures.

3. A process which comprises heating quartz sand ground to dust with a quantity of caustic potassium lye of commercial concentration in an excess of several percent of that theoretically required for the formation of the metasilicate to boiling temperatures while agitating the reaction mass, until a temperature of about 190° C. is attained, then maintaining a temperature between about 190° C. and about 200° C. and a partial water vapour tension of between about 200 and about 500 mms. of mercury column until crystallisation is terminated, and finally dehydrating the product by the application of still higher temperatures.

4. A process for the production of a pulverulent, readily soluble, substantially anhydrous product consisting essentially of alkali metal meta silicate and alkali metal hydroxid suitable for use as a detergent which comprises forming a mixture of quartz sand and an aqueous solution of alkali metal hydroxid containing alkali metal hydroxid in quantity in excess of that theoretically required to convert the silicic acid content of the sand into alkali metal meta silicate, heating the mixture at boiling temperature with agitation while permitting the water content of the mixture to evaporate until a pulverulent dry product is formed.

5. Process as defined in claim 4 in which the alkali metal is sodium.

MAX JAEGER.
FRANZ BESEMANN.